United States Patent [19]

Miller et al.

[11] 4,181,599

[45] Jan. 1, 1980

[54] NAPHTHA PROCESSING INCLUDING REFORMING, ISOMERIZATION AND CRACKING OVER A ZSM-5-TYPE CATALYST

[75] Inventors: Stephen J. Miller, El Cerrito; Thomas R. Hughes, Orinda, both of Calif.

[73] Assignee: Chevron Research Company, San Francisco, Calif.

[21] Appl. No.: 954,061

[22] Filed: Oct. 23, 1978

[51] Int. Cl.² .................. C07C 15/02; B01J 29/28; C07C 5/24
[52] U.S. Cl. .................................... 208/79; 208/80; 208/111; 208/135; 208/139
[58] Field of Search .................. 208/79, 80, 64, 111; 260/673, 683.65

[56] References Cited

U.S. PATENT DOCUMENTS

| | | | |
|---|---|---|---|
| 2,905,619 | 9/1959 | Sutherland | 208/64 |
| 3,002,916 | 10/1961 | Hamilton | 208/64 |
| 3,700,585 | 10/1972 | Chen et al. | 208/111 |
| 3,753,891 | 8/1973 | Graven et al. | 208/62 |
| 3,871,993 | 3/1975 | Morrison | 208/135 |
| 3,950,241 | 4/1976 | Bonacci et al. | 208/64 |

*Primary Examiner*—Delbert E. Gantz
*Assistant Examiner*—G. E. Schmitkons
*Attorney, Agent, or Firm*—D. A. Newell; R. H. Davies; M. K. Bosworth

[57] ABSTRACT

A straight-run naphtha is fractionated into a light naphtha fraction and a heavy naptha fraction containing methylcyclopentane and heavier hydrocarbons. The heavy fraction is reformed and the $C_5$–$C_6$ paraffin portion of the reformate combined with the light naphtha fraction for isomerization. The heavy reformate is converted over a ZSM-5-type catalyst to produce a product enriched in aromatics which may be sent for BTX recovery or to a gasoline pool as a high-octane gasoline blending stock.

6 Claims, 1 Drawing Figure

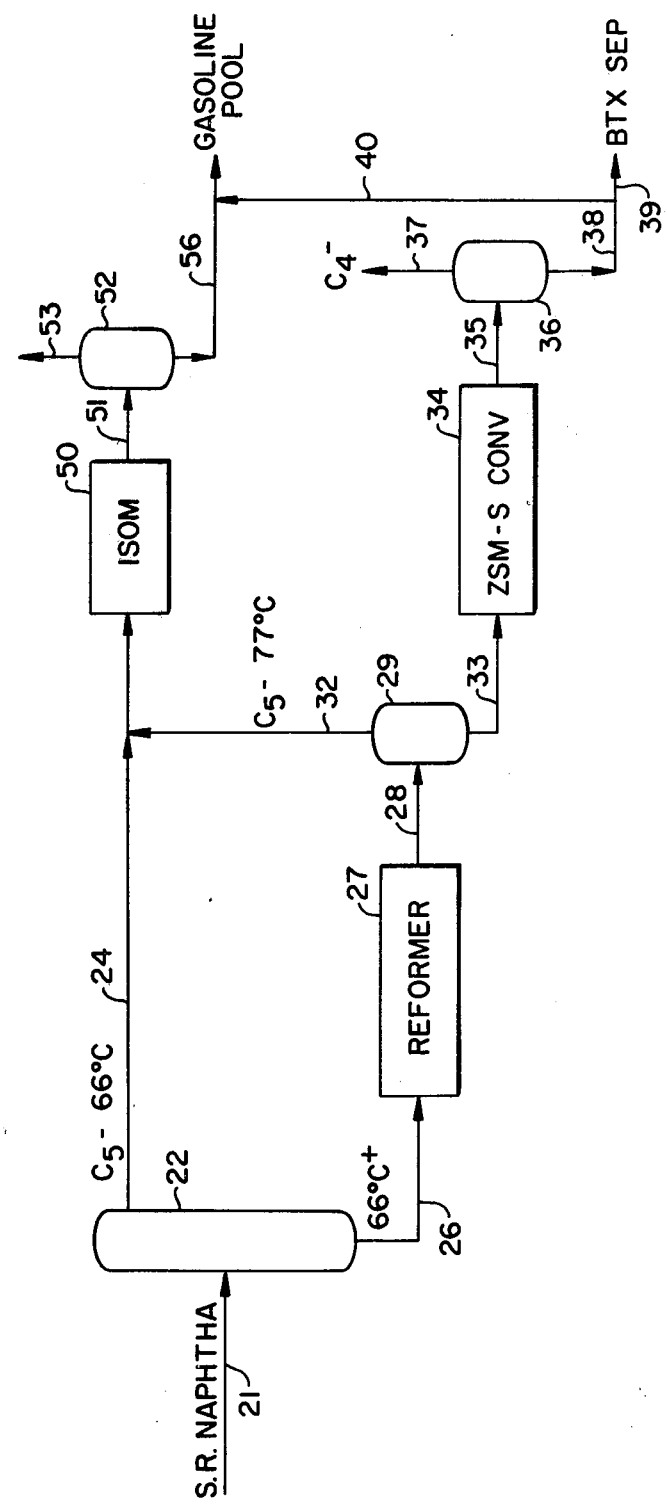

NAPHTHA PROCESSING INCLUDING REFORMING, ISOMERIZATION AND CRACKING OVER A ZSM-5-TYPE CATALYST

BACKGROUND AND SUMMARY OF THE INVENTION

This invention relates to a combination process for upgrading a naphtha fraction. Specifically, the invention relates to a process combining reforming, isomerization and hydrocracking in the presence of a ZSM-5-type zeolite to produce a product useful as a high-octane gasoline blending stock and as a source for recovering benzene, toluene and xylene.

Reforming of hydrocarbon fractions such as naphthas, gasolines and kerosenes is a widely used process for improving the anti-knock characteristics and the octane number thereof. During reforming, a multitude of reactions takes place, including converting naphthenes and paraffins into aromatics, both reactions which substantially increase the octane number of the hydrocarbons involved. Naphthenes are reformed to aromatics with high selectivity. However, the selectivity with which paraffins are converted to aromatics is lower than that for naphthenes and decreases with the number of carbon atoms per paraffin molecule. Only a minor fraction of $C_6$ paraffins is converted to benzene. In addition, paraffins are isomerized and cracked to low-molecular-weight hydrocarbons. The cracking to $C_3-$ hydrocarbons represents an irreversible yield loss, while isomerization of paraffins mainly to singly branched paraffins is a reversible reaction in which a relatively high concentration of low-octane n-paraffins remain in thermal equilibrium with the branched isomers. Thus, the inclusion of $C_6$ paraffinic hydrocarbons in a reformer feed is a less efficient use of the catalyst and the reactor facilities than inclusion of $C_6+$ naphthenes. Another way of upgrading hydrocarbons by increasing the aromatics content thereof is provided by severe cracking over such catalysts as ZSM-5, as is taught in U.S. Pat. Nos. 3,756,942 and 3,760,024, which are incorporated herein by reference. The concentrated aromatics fractions are useful as a source of benzene, toluene and xylene as well as a high-octane gasoline blending stock.

Another traditional method for upgrading hydrocarbon fractions includes isomerization of $C_5$ and $C_6$ paraffinic components.

The present invention is directed to a processing combination which makes optimum use of a reforming zone, an isomerization zone and a ZSM contacting zone to provide a high-octane gasoline blending stock in a high yield.

Briefly, according to the process of the present invention, a naphtha feedstock is separated into a light naphtha fraction and a heavy naphtha fraction, the heavy naphtha fraction is catalytically reformed and then the reformate stream separated into a light reformate fraction and heavy reformate fraction. The light reformate fraction is combined with the light naphtha fraction and the resulting mixture is catalytically isomerized. The $C_5+$ portion of the isomerized effluent is recovered as a high-octane gasoline blending stock. The heavy reformate fraction is passed through a ZSM-5 conversion zone operated at conditions to crack $C_7+$ paraffins and to isomerize $C_8$ aromatics. The effluent from the ZSM conversion zone may be sent to a gasoline pool, or a portion of it sent for recovery of benzene, toluene and xylene values, and the resulting benzene, toluene and xylene-depleted stream may be sent to the gasoline pool.

Specifically, there is provided a process for upgrading a naphtha-boiling range hydrocarbon to useful products, which comprises:

(1) separating said naphtha into a light naphtha fraction boiling below methylcyclopentane and containing $C_6$ aliphatics and lower-boiling hydrocarbons, and a heavy naphtha fraction containing methylcyclopentane and higher-boiling hydrocarbons;

(2) reforming said heavy naphtha fraction under reforming conditions to produce a reformate stream enriched in aromatics compared with said heavy naphtha fraction;

(3) separating said reformate stream into a heavy reformate fraction containing benzene and higher-boiling hydrocarbons and a light reformate fraction containing $C_5$ and $C_6$ paraffinic hydrocarbons;

(4) passing said light reformate fraction together with said light naphtha fraction into contact with a hydrocarbon isomerization catalyst under isomerization conditions including a temperature from 50° to 300° C. (122° to 572° F.), preferably from 150° to 275° C. (302° to 527° F.), and a pressure from 0.5 to 100 atmospheres, preferably from 10 to 50 atmospheres, and recovering the resultant isomerized product comprising $C_5+$ hydrocarbons having a higher proportion of multi-branched paraffins than the feed to the isomerizing operation;

(5) passing said heavy reformate fraction into contact with a ZSM-5-type zeolite catalyst under conditions including a temperature from 371° C. to 482° C. (700°–900° F.), a pressure from 1.7 to 55 atmospheres (10 to 800 psig), and a hydrogen to hydrocarbon mol ratio from 1 to 15, selected to effect cracking of normal and lightly branched paraffins as well as isomerization of xylenes, and recovering a hydrocarbon effluent deficient in $C_6+$ paraffins from the ZSM-5 contacting operation; and (6) separating said effluent deficient in $C_6+$ paraffins into a $C_4-$ stream and a $C_5+$ product stream enriched in benzene, toluene and xylene values.

A preferred feature of the present invention is to combine at least a portion of the $C_5+$ product stream from the ZSM contacting operation with said isomerized hydrocarbon product to form a gasoline blending stock having a research octane number above about 90 (Clear), preferably above 95, and still more preferably above 100. Another preferred feature of the present invention is to recover benzene, toluene and xylene values from at least a portion of the $C_5+$ product stream from the ZSM contacting operation and combining the resulting benzene, toluene and xylene-deficient stream with the $C_5+$ portion of the isomerized hydrocarbon product to form a hydrocarbon blend having a research octane number above 90 and preferably above about 95 (Clear).

DESCRIPTION OF THE FIGURE

The FIGURE is a schematic block flow diagram of the preferred embodiment of the present invention in which each block represents one particular step or zone of the process. Conventional items such as pumps, compressors, miscellaneous valving, etc., are believed to be well within the skill in the art and have been omitted from the FIGURE. Likewise, with respect to the piping throughout the process system, only major streams required to illustrate the relationships between various stages are presented. Accordingly, various recycle lines and vent gas streams, etc., have also been omitted.

DETAILED DESCRIPTION

Referring to the flow diagram depicted in the FIGURE, an Arabian straight-run naphtha fraction boiling in the range of $C_5$-193° C. (380° F.) is charged through line 21 into fractionator 22. The naphtha has an approximate composition of 66 volume percent paraffins, 21 volume percent naphthenes and 13 volume percent aromatics. In the fractionator, the naphtha is separated at about 66° C. (150° F.) into a light naphtha fraction comprising $C_5$ and $C_6$ hydrocarbons boiling under about 66° C. (150° F.) and a heavy naphtha fraction boiling above about 66° C. (150° F.) which includes most of the methylcyclopentane. The light naphtha fraction, about 10 volume percent of the feed, is removed from fractionator 22 via line 24. The heavy naphtha fraction, about 90 volume percent of the feed, is charged via line 26 into reformer 27 in which it is reformed under conventional reforming conditions with a platinum-rhenium-chloride reforming catalyst (see, for example, U.S. Pat. No. 3,415,737, incorporated herein by reference.) The reformer acts to increase the aromatics content and octane number of the naphtha. The reformate, having a research octane number of about 98, in a yield of approximately 83 liquid volume percent and substantially depleted of naphthenes, is passed to separation zone 29 via line 28. In separation zone 29, which may comprise one or more stages, hydrogen is recovered for recycle to the reformer (not shown), $C_4-$ light gases are removed and the $C_5+$ reformate is split into two fractions. The first fraction is a $C_5-77°$ C. (170° F.) light reformate which is removed from the separator via line 34. The light reformate has a research octane number of about 71 and is about 10 liquid volume percent of the total reformate.

The light reformate in line 32 is combined with the light straight-run naphtha fraction having a research octane number of about 65 in line 24 and passed as a composite stream via line 24 into isomerization zone 50, where it is contacted in the presence of hydrogen (supply line not shown) with a hydrocarbon isomerization catalyst. The isomerization conditions in zone 40 include a temperature of approximately 150° C. (302° F.), a pressure of 15 atmospheres, a liquid hourly space velocity of 1.5 V/V/Hr and a hydrogen to hydrocarbon mol ratio of 3. The resulting isomerizate is withdrawn in line 51 and passed to separator 52 wherein it is separated into a $C_4-$ fraction and a liquid hydrocarbon fraction in about a 95 liquid volume percent yield and having a research octane number of about 79. The $C_4-$ fraction is withdrawn from separator 52 via line 53 and the hydrogen component therein may be separated and recycled to isomerization zone 50, if desired. The $C_5+$ fraction from separator 52 is withdrawn via line 56 and passed to a gasoline pool as a high-octane gasoline blending stock.

Referring again to separator 29, the portion of the reformate boiling above 77° C. (170° F.) is passed via line 33 to ZSM conversion zone 34. About 90 liquid volume percent of the reformate leaves separator 29 via line 33 and this heavy reformate fraction has a research octane number of approximately 100. In the ZSM reaction zone, the heavy reformate is contacted with an H-ZSM-5 catalyst comprising 50% zeolite and 50% Catapal matrix. ZSM reaction conditions include a temperature of 343° C. (650° F.), a pressure of 28 atmospheres (400 psig), a hydrogen to hydrocarbon mol ratio of 5, and a liquid hourly space velocity of 2 V/V/Hr. The ZSM reactor is operated at reaction conditions to crack out paraffins, leaving mainly aromatics in the effluent, and to isomerize the xylenes as well as generally upgrade the octane of the effluent. The effluent from the ZSM reactor is withdrawn via line 35 and is charged to separator 36. A $C_4-$ fraction is withdrawn from the top of the separator via line 37 and a $C_5+$ fraction is removed from separator 36 via line 38. The $C_5+$ fraction has a research octane number of approximately 113, contains approximately 45 volume percent BTX and represents about 85 volume percent of the feed to the ZSM reaction zone. The $C_5+$ fraction in line 38 may be sent via line 40 to form a part of the high-octane gasoline pool, or some or all of it may be sent via line 39 to a BTX separation step, and if desired the BTX-depleted stream may be returned to the gasoline pool.

The advantage to the flow scheme of the present invention is that it allows the isomerization zone, the reforming zone and the ZSM reaction zone each to be operated with the feedstocks that are converted most effectively therein. The $C_5$-66° C. portion of the straight-run naphtha is more advantageously isomerized than reformed, because the lower temperatures in the isomerization zone favor production of more highly branched paraffins with a resulting higher octane. In the reformer, $C_5$ and $C_6$ paraffins would suffer a yield loss due to cracking as well as having a relatively high equilibrium amount of low-octane normal and slightly branched paraffins. Thus, the process of the present invention provides for sending the portion of the naphtha containing $C_6+$ naphthenes (such as methylcyclopentane) and higher-boiling hydrocarbons to the reforming zone where the naphthenes are efficiently converted to aromatics, while the light naphtha containing $C_5$ and most of the $C_6$ paraffins is sent to the isomerization zone.

The advantage of splitting the reformate into a light fraction (boiling from $C_5$ to 77° C.) is that this fraction may be isomerized to further increase the octane number with little decrease in yield. The heavy reformate containing benzene and higher-boiling hydrocarbons is advantageously contacted with the ZSM catalyst at cracking conditions to remove any $C_7+$ paraffins and leave a product stream concentrated in aromatics such as benzene, toluene and xylene.

Process Feeds

Feedstocks suitable for use in the process of the present invention include full-boiling-range naphtha hydrocarbon materials boiling in the range of $C_5$ hydrocarbons up to about 175°-200° C. (347°-392° F.) which contain low-octane paraffinic $C_5$ and $C_6$ components. The naphtha hydrocarbon materials may be derived from any natural or synthetic crude oils.

Reforming Stage

The reformer of the present invention is a conventional one in which the feedstock is contacted with a platinum-containing reforming catalyst and preferably a bimetallic catalyst such as platinum-rhenium-chloride on alumina, under reaction conditions such as a temperature from 427°-552° C. (800°-1025° F.), preferably from 454°-538°C. (850°-1000° F.), a pressure from atmospheric to 50 atmospheres or higher, preferably from 6.8 to 40 atmospheres, a liquid hourly space velocity from 0.1 to 10, preferably from 0.5 to 5, and a hydrogen to hydrocarbon mol ratio from 0.5 to 20 and preferably from 1 to 10. During reforming, a multitude of reactions takes place, including dehydrogenation, isomerization, dehydrocyclization, hydrocracking, and combinations thereof to yield a product having an increased content of aromatics and branched-chain hydrocarbons. The reformer is especially efficient when used to convert naphthenes to aromatics.

ZSM Reaction Zone

The reformate is passed over a ZSM-5-type catalyst in a ZSM reaction zone operated at conditions to crack paraffins and isomerize $C_8$ aromatics in the feedstock. These reaction conditions include a temperature from 371°–482° C. (700°–900° F.), a hydrogen pressure from 1.7 to 55 atmospheres, an LHSV from 0.1 to 20 and preferably from 1 to 5 (and a hydrogen to hydrocarbon mol ratio from) 1 to 10 and preferably from 3 to 8.

The ZSM-5-type zeolite itself is known in the art per se and is exemplified by ZSM-5, ZSM-8, ZSM-11 and ZSM-35 and other similar materials. ZSM-5-type zeolites, described in U.S. Pat. Nos. 3,702,886, 3,729,409 and 3,770,614 describe the ZSM-5 preparation, composition and use as well as related information and are incorporated herein by reference. The H-ZSM-5 form of the ZSM-5 zeolites required herein is preferred, and may be obtained by conventional base and/or ion-exchange methods well known to the art. It is especially beneficial with respect to the catalyst life and suppression of coke formation for the ZSM-5 zeolite to have a silica-alumina mol ratio from 40 to 160 and preferably from 60 to 120. The catalyst in the ZSM reaction zone may be any convenient form, that is, as required for conventional fixed, fluid or slurry usage. Preferably the ZSM-5-type catalyst is a fixed-bed type with the zeolite being composited with an inorganic binder or matrix such as alumina, silica, silica-alumina mixtures, naturally occurring and conventionally processed clays, e.g., kaolin and the like, as well as silica-magnesia, silica-zirconia, etc., and mixtures of any of them. The composite is preferably prepared by mixing the binder or matrix in the form of the gel or a cogel with the zeolite, followed by shaping or extruding to the desired form and size customary for the intended use. The relative proportions of zeolite and binder may vary widely, from 5% to 95% by weight, with preferably 35% to to 80% and more preferably about 65% of the composition being zeolite. The preferred binder is alumina.

Isomerization Zone

The isomerization zone is used to isomerize $C_5$ and $C_6$ paraffins in the light naphtha and light reformate fractions. Any suitable light paraffinic hydrocarbon isomerization catalyst and method may be used and numerous suitable methods have been described in the prior art and descriptions of representative methods are given in an article entitled "Advances in Isomerization" by P.A. Lawrence et al, Proceedings of the Seventh World Petroleum Congress, Volume IV, pp. 135–145, Elsevier Publishing Company (1967). Other examples of isomerization processes for paraffins appear in the following U.S. Pat. Nos.: 2,834,823, 3,190,939, 3,527,835, 3,577,479, 3,578,725, and 3,789,082.

In a preferred embodiment, the isomerization is carried out using as the catalyst a chlorided composite of platinum dispersed upon porous alumina (e.g., see U.S. Pat. No. 3,789,082, Example 1). In another preferred embodiment, the catalyst employed is a composite of palladium and ultra-stable Y crystalline aluminosilicate molecular sieve in the H form (see, for example, U.S. Pat. No. 3,293,192). This catalyst is prepared by any suitable method. For example an aqueous solution of the palladium salt is admixed with acid-peptized alumina hydrogel and, thereafter, the palladium is gravimetrically precipitated in a finely divided form by admixing a minor amount of 1,2,3-benzotriazole in hydrogel (see for example U.S. Pat. No. 3,978,001). Next, the H-Y sieve is admixed with the hydrogel and the resulting composite is shaped, dried and calcined for use. Sufficient amounts of the components are used to provide on a dry basis for each 100 parts by weight a composite containing alumina, ultra-stable Y-sieve and palladium in an amount of 35, 65 and 0.3 parts, respectively. The relative amounts of these components may be varied widely as in the conventional practice, and yet the catalyst will be effective for isomerizing the feed herein. The isomerization of the $C_5$-$C_6$ paraffinic hydrocarbon feed under hydrocarbon isomerizing conditions per se is not here considered as inventive.

What is claimed is:

1. A process for upgrading a naphtha-boiling range hydrocarbon to useful products, which comprises:
    (1) separating said naphtha into a light naphtha fraction boiling below methylcyclopentane and containing $C_6$ aliphatics and lower-boiling hydrocarbons, and a heavy naphtha fraction containing methylcyclopentane and higher-boiling hydrocarbons;
    (2) reforming said heavy naphtha fraction under reforming conditions to produce a reformate stream enriched in aromatics compared with said heavy naphtha fraction;
    (3) separating said reformate into a heavy reformate fraction containing benzene and higher-boiling hydrocarbons and a light reformate fraction containing $C_5$ and $C_6$ paraffinic hydrocarbons;
    (4) passing said light reformate fraction together with said light naphtha fraction into contact with a hydrocarbon isomerization catalyst under isomerization conditions including a temperature from 50° to 300° C. and a pressure from 0.5 to 100 atmospheres and recovering the resultant isomerized product comprising $C_5+$ hydrocarbons having a higher proportion of multi-branched paraffins than the feed to the isomerizing operation;
    (5) passing said heavy reformate fraction into contact with a ZSM-5-type zeolite catalyst under conditions including a temperature from 371° C. to 482° C. (700°–900° F.), a pressure from 1.7 to 55 atmospheres (10 to 800 psig), and a hydrogen to hydrocarbon mol ratio from 1 to 15 selected to effect cracking of normal and lightly branched paraffins as well as isomerization of xylenes, and recovering a hydrocarbon effluent deficient in $C_6+$ paraffins from the ZSM-5 contacting operation; and
    (6) separating said effluent deficient in $C_6+$ paraffins into a $C_4-$ stream and a $C_5+$ product stream enriched in benzene, toluene and xylene values.

2. The process of claim 1 wherein at least a portion of said $C_5+$ product stream from said ZSM contacting operation is combined with said isomerized hydrocarbon product to form a gasoline blend having a research octane number above about 95 (Clear).

3. The process of claims 1 or 2 wherein benzene, toluene and xylene values are recovered from at least a portion of said C$_5$+ product stream from said ZSM contacting operation and the resulting benzene, toluene and xylene-deficient stream is combined with the C$_5$+ portion of said isomerized hydrocarbon product to form a hydrocarbon blend having a research octane number above about 95 (Clear).

4. The process of claim 1 wherein said ZSM-5-type zeolite is H-ZSM-5.

5. The process of claim 1 wherein said isomerizing catalyst is a composite of palladium, ultra-stable H-Y zeolite and alumina matrix.

6. The process of claim 1 wherein said isomerizing catalyst is a chlorided composite of platinum and alumina.

* * * * *